US 12,450,583 B2

(12) United States Patent
Barrett et al.

(10) Patent No.: US 12,450,583 B2
(45) Date of Patent: Oct. 21, 2025

(54) POINT OF SALE SYSTEM WITH REMOTE WAKE

(71) Applicant: Oracle International Corporation, Redwood Shores, CA (US)

(72) Inventors: Douglas J. Barrett, Eldersburg, MD (US); Paul Schleicher, Ellicott City, MD (US); Chengge Fan, Singapore (SG); Ho Meng Hua, Singapore (SG)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 17/728,139

(22) Filed: Apr. 25, 2022

(65) Prior Publication Data

US 2023/0342745 A1    Oct. 26, 2023

(51) Int. Cl.
 G06F 1/32    (2019.01)
 G06F 1/16    (2006.01)
 G06F 9/4401   (2018.01)
 G06Q 20/20   (2012.01)
 H04M 1/73    (2006.01)

(52) U.S. Cl.
 CPC ......... *G06Q 20/202* (2013.01); *G06F 9/4418* (2013.01)

(58) Field of Classification Search
 CPC .................... G06Q 20/202; G06F 9/4418
 See application file for complete search history.

(56) References Cited

U.S. PATENT DOCUMENTS

| | | | |
|---|---|---|---|
| 7,483,966 B2* | 1/2009 | Cromer | G06F 1/26 709/224 |
| 2004/0032420 A1* | 2/2004 | Allen | G06Q 40/00 715/700 |
| 2009/0241113 A1* | 9/2009 | Seguin | G06F 1/3209 718/1 |
| 2012/0316953 A1* | 12/2012 | Ramchandani | G06Q 20/352 705/14.58 |
| 2013/0179285 A1* | 7/2013 | Lyle | G06Q 30/06 705/26.1 |
| 2013/0254100 A1* | 9/2013 | Jones | G06Q 20/3278 705/39 |
| 2014/0040120 A1* | 2/2014 | Cho | G06Q 20/3278 705/39 |
| 2014/0250311 A1* | 9/2014 | Kubota | G06F 1/266 713/310 |
| 2015/0347329 A1* | 12/2015 | Lu | H04W 4/80 710/302 |
| 2015/0362984 A1* | 12/2015 | Waters | G06F 1/3287 713/324 |
| 2015/0370299 A1* | 12/2015 | Waters | G06F 13/364 713/310 |
| 2016/0320819 A1* | 11/2016 | Atkinson | G06F 1/26 |

(Continued)

Primary Examiner — Talia F Crawley
(74) Attorney, Agent, or Firm — Potomac Law Group, PLLC (57) ABSTRACT

One embodiment is a point of sale system that includes a head unit and an input output (I/O) unit coupled to the head unit and coupled to a network. The I/O unit includes a first controller adapted to, in response to a wake up event received from the network, generating a wake up message and transmitting the wake up message to the head unit. The head unit includes a second controller and a processor, the second controller adapted to receive the wake up message and in response generate a power on signal to the processor.

20 Claims, 5 Drawing Sheets

(56) References Cited

U.S. PATENT DOCUMENTS

| | | | |
|---|---|---|---|
| 2018/0004541 A1* | 1/2018 | Jang | G06F 1/3287 |
| 2018/0203768 A1* | 7/2018 | Huang | G06F 11/1441 |
| 2018/0321728 A1* | 11/2018 | Morse | G06F 1/3287 |
| 2019/0066073 A1* | 2/2019 | Yen | G06Q 30/016 |
| 2019/0228374 A1* | 7/2019 | Hicks | G06Q 20/204 |
| 2021/0264754 A1* | 8/2021 | Baker | G08B 21/0275 |
| 2022/0209475 A1* | 6/2022 | Alden | H05B 47/11 |

* cited by examiner

Fig. 1

PRIOR ART

POINT OF SALE SYSTEM WITH REMOTE WAKE

One embodiment is directed generally to a computer system, and in particular to a computer system that implements a point of sale terminal/system.

BACKGROUND INFORMATION

A point of sale ("POS") or point of purchase ("POP") is the time and place where a retail transaction is completed. At the POS, a merchant/retailer can calculate the amount owed by the customer, indicate that amount, prepare an invoice for the customer (which may be a printout), and indicate the options for the customer to make payment. It is also the point at which a customer makes a payment to the merchant in exchange for goods or after provision of a service. After receiving payment, the merchant may issue a receipt for the transaction, which is usually printed but can also be dispensed with or sent electronically. At the POS, there is typically a POS system to facilitate this functionality.

POS systems, in particular, have drastically changed the food and beverage industry. Modern POS systems have transformed the old cash register into computers, most commonly with touchscreens. These POS systems connect to a hosted "cloud" service, or to an on premise server, or can operate in a stand-alone mode. POS systems can be configured for employees to enter customer orders, or for customers to enter their orders in a kiosk mode, or can be reconfigured dynamically for either use case or a hybrid of both.

Typical restaurant POS software is able to create and print guest checks, print orders to kitchens and bars for preparation, process credit cards and other payment cards, and run reports. In addition, some systems implement wireless pagers and electronic signature-capture devices.

In the fast food industry, displays may be at the front counter, or configured for drive-through or walk-through cashiering and order taking. Front counter registers allow taking and serving orders at the same terminal, while drive-through registers allow orders to be taken at one or more drive-through windows to be cashiered and served at another. In addition to registers, drive-through and kitchen displays are used to view orders. Once orders appear they may be deleted or recalled by the touch interface or by bump bars. Drive-through systems are often enhanced by the use of drive-through wireless (or headset) intercoms. The efficiency of such systems has decreased service times and increased efficiency of orders.

Another innovation in technology for the restaurant or other retail industry is the wireless POS. Many restaurants with high volume use a wireless handheld POS to collect orders which are sent to a server. The server sends required information to the kitchen in real time. Wireless systems can include drive-through microphones and speakers, which are wired to a "base station" or "center module." This, in turn, will broadcast to headsets. Headsets may be an all-in-one headset or one connected to a belt pack.

Tablet POS systems popular for retail solutions are becoming prevalent in the restaurant industry. Tablet systems today are being used in all types of restaurants including table service operations. Most tablet systems upload all information to the Internet so managers and owners can view reports from anywhere with a password and Internet connection. Smartphone Internet access has made alerts and reports from the POS very accessible. Tablets have helped create the mobile POS system, and mobile POS applications also include payments, loyalty, online ordering, table side ordering by staff and table top ordering by customers. Regarding the payments, a mobile POS can accept all kinds of payment methods from contactless cards, EMV chip-enabled cards, and mobile NFC enabled cards.

With the proliferation of low-priced touchscreen tablet computers, more and more restaurants and other retail outlets have implemented self-ordering through tablet POS placed permanently on every table. Customers can browse through the menu on the tablet and place their orders which are then sent to the kitchen. Most restaurants that have touchscreen self-order menus include photos of the dishes so guests can easily choose what they want to order.

SUMMARY

One embodiment is a point of sale system that includes a head unit and an input output (I/O) unit coupled to the head unit and coupled to a network. The I/O unit includes a first controller adapted to, in response to a wake up event received from the network, generating a wake up message and transmitting the wake up message to the head unit. The head unit includes a second controller and a processor, the second controller adapted to receive the wake up message and in response generate a power on signal to the processor.

BRIEF DESCRIPTION OF THE DRAWINGS

Further embodiments, details, advantages, and modifications will become apparent from the following detailed description of the embodiments, which is to be taken in conjunction with the accompanying drawings.

DETAILED DESCRIPTION

One embodiment is a point of sale ("POS") system that includes a head unit and separate networked Input/Output ("I/O") module. Embodiments provide remote wake functionality to wake the head unit after it shuts down or goes into sleep mode via a signal sent to the separate I/O module.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
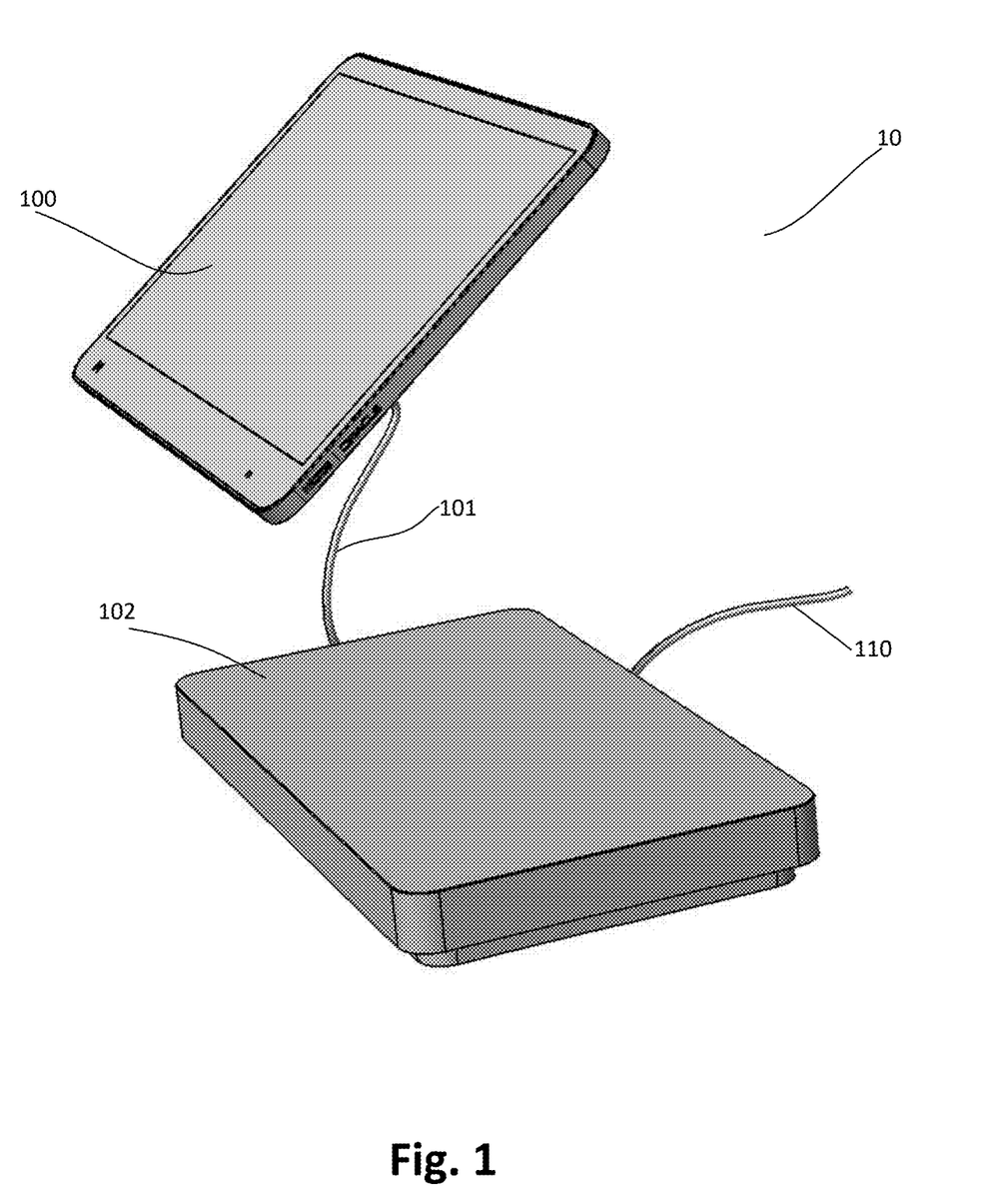
FIG. 1 is a perspective view of a POS system in accordance with embodiments.

FIG. 1 is a perspective view of a POS system 10 in accordance with embodiments. POS system 10 includes a head 100 and a separate I/O module/unit 102. Head 100 is coupled to I/O module 102 via any type of wired means that transmits both data and power from I/O module 102 to head 100. In one embodiment, head 100 is coupled to I/O module 102 via a "Universal Serial Bus-C" ("USB-C") cable. A USB-C cable can transfer electronic signals as well as transfer power. A standard USB-C connector can provide up to 100 watts of power. I/O module 102 can be physically connected to head 100 via, for example, a stand, not shown, but is typically remote from head 100. For example, in a restaurant environment, I/O module 102 can be located beneath a counter on which head 100 is placed, using a stand, so that head 100 is visible and accessible to a customer, and I/O module 102 is not visible or easily accessible to the customer.

I/O module 102 is coupled to additional I/O modules and/or a server system via a wireless or wired network. In one embodiment, I/O module 102 is coupled to the network via an Ethernet local area network ("LAN") cable 110. In other embodiments, other wired or wireless networking can be used, such as a token ring network. I/O module 102 and/or other systems/servers coupled to Ethernet LAN cable 110 provide remote functionality to head 100, including data storage, processing, and remote software functionality. In one embodiment, head 100 implements POS software, such as "Oracle MICROS Simphony Point of Sale" from Oracle Corp.

Although not shown in FIG. 1, I/O module 102 includes a LAN integrated circuit ("IC") chip coupled to Ethernet LAN cable 110, and head 100 includes a central processing unit ("CPU")/processor that implements software functionality. Consequently, the LAN IC chip and head processor reside in separate boxes or caseworks, and therefore cannot communicate directly. Further, the processor in head 100 is on a different motherboard/PC board than the LAN IC chip of I/O module 102, wherein the two motherboards are connected by the Type-C cable 101.

Head 100, in general, functions like a computer and includes a low power mode or soft off state in which the components, including the screen, is powered down or operates in a lower power mode after the passage of time from a last use. This mode saves energy and saves wear and tear on components. There is a need to remotely wake up system 10 in such situations.

For "standard" computers, such as all-in-one systems where all components are located in a single enclosure (e.g., laptop and desktop computers), an industry standard method, referred to as "Wake-on-LAN" ("WOL") provides remote wake up functionality. WOL can power up ("wake") a specific targeted CPU system that is in a low power or soft off state. A second computer system on the LAN network issues a Wake Event to the targeted system in order to wake that system.

Figure 2:
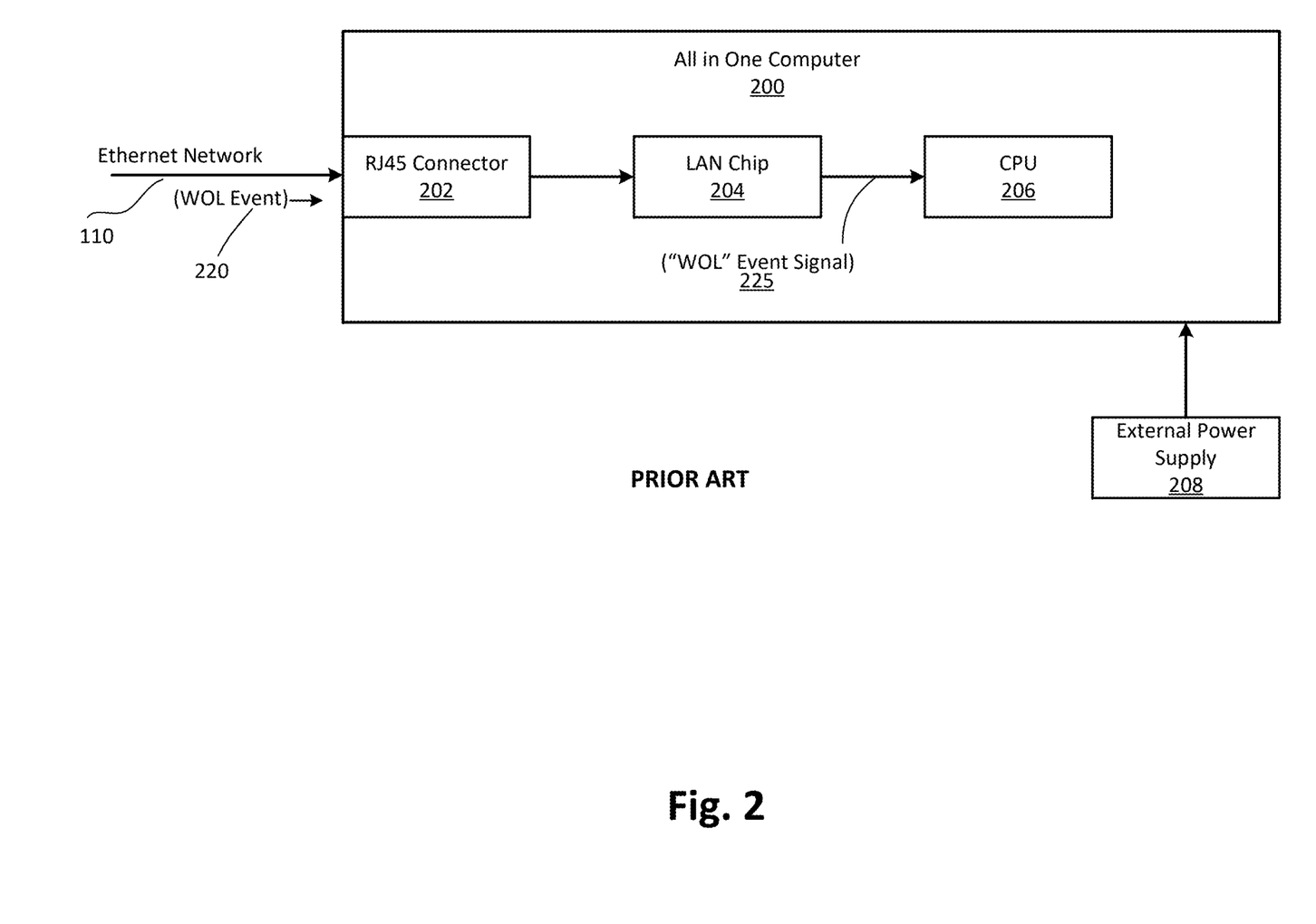
FIG. 2 is a block diagram of a prior art all-in-one computer that implements Wake-on-LAN.

FIG. 2 is a block diagram of a prior art all-in-one computer 200 that implements WOL. Computer 200 is coupled to an Ethernet network via an Ethernet LAN cable 110. An RJ45 connector 202 is coupled to the network, and is coupled to a LAN chip 204. LAN chip 204 is then coupled/connected to a CPU 206 via its own standard signaling. A LAN chip is a device on an Ethernet network that broadcasts information and provides Ethernet functions, including PHYceivers and media access control ("MAC"). Ethernet is a system for connecting computers within a building by using hardware running from machine to machine. A WOL event signal 220 from the network results in a direct electrical signal connection from the LAN network chip 204 to the CPU chipset 206 in the form of a WOL event signal 225, which causes CPU 206 to wake up computer 200 using an external power supply 208.

More specifically, WOL as illustrated in FIG. 2 is an Ethernet or Token Ring computer networking standard that allows a computer to be turned on or awakened by a network message. The message is usually sent to the target computer by a program executed on a device connected to the same local area network. It is also possible to initiate the message from another network by using subnet directed broadcasts or a WOL gateway service.

Ethernet connections, including home and work networks, wireless data networks and the Internet itself, are based on frames sent between computers. WOL is implemented using a specially designed frame, referred to as a "magic packet" (i.e., WOL event 220), which is sent to all computers in a network, among them the computer to be awakened. The magic packet contains the media access control ("MAC") address of the destination computer, an identifying number built into each network interface card ("NIC") or other ethernet device in a computer, that enables it to be uniquely recognized and addressed on a network. Powered-down or turned off computers capable of WOL will contain network devices (e.g., LAN chip 204) able to "listen" to incoming packets in low-power mode while the system is powered down. If a magic packet is received that is directed to the device's MAC address, the NIC signals the computer's power supply or motherboard to initiate system wake-up, in the same way that pressing the power button would do.

The magic packet is sent on the data link layer (layer 2 in the Open Systems Interconnection ("OSI") model) and when sent, is broadcast to all attached devices on a given network, using the network broadcast address; the IP-address (layer 3 in the OSI model) is not used.

Because WOL is built upon broadcast technology, it can generally only be used within the current network subnet. There are some exceptions, though, and WOL can operate across any network in practice, given appropriate configuration and hardware, including remote wake-up across the Internet.

In order for WOL to work, parts of the network interface need to stay on. This consumes a small amount of standby power, much less than normal operating power. The link speed is usually reduced to the lowest possible speed to not waste power (e.g., a Gigabit Ethernet NIC maintains only a 10 Mbit/s link). Disabling WOL when not needed can very slightly reduce power consumption on computers that are switched off but still plugged into a power socket. The power drain becomes a consideration on battery powered devices such as laptops as this can deplete the battery even when the device is completely shut down.

The magic packet is a frame that is most often sent as a broadcast and that contains anywhere within its payload 6 bytes of all 255 (FF FF FF FF FF FF in hexadecimal), followed by sixteen repetitions of the target computer's 48-bit MAC address, for a total of 102 bytes.

Since the magic packet is only scanned for the string above, and not actually parsed by a full protocol stack, it could be sent as payload of any network- and transport-layer protocol, although it is typically sent as a UDP datagram to port 0 (reserved port number), 7 (Echo Protocol) or 9 (Discard Protocol), or directly over Ethernet as EtherType 0x0842. A connection-oriented transport-layer protocol such as Transmission Control Protocol ("TCP") is less suited for this task as it requires establishing an active connection before sending user data.

A standard magic packet has the following basic limitations: (1) Requires destination computer MAC address (also may require a SecureOn password); (2) Does not provide a delivery confirmation; (3) May not work outside of the local network; (4) Requires hardware support of WOL on destination computer; and (5) Most 802.11 wireless interfaces do not maintain a link in low power states and cannot receive a magic packet.

The WOL implementation is designed to be very simple and to be quickly processed by the circuitry present on the network interface card with minimal power requirement. Because WOL operates below the IP protocol layer, IP addresses and DNS names are meaningless and so the MAC address is required.

However, in contrast to the use of WOL in systems such as computer 200 of FIG. 2, as will be described in detail below, with POS system 100 in accordance to embodiments, the remote LAN chip is located within an external hub or docking station, (i.e., I/O Module 110). Therefore, in embodiments, the LAN chip is not directly connected to the CPU chipset, and WOL is not possible by the standard known methods. Therefore, embodiments implement a novel solution to notify the CPU in head 100 of the WOL event.

Figure 3:
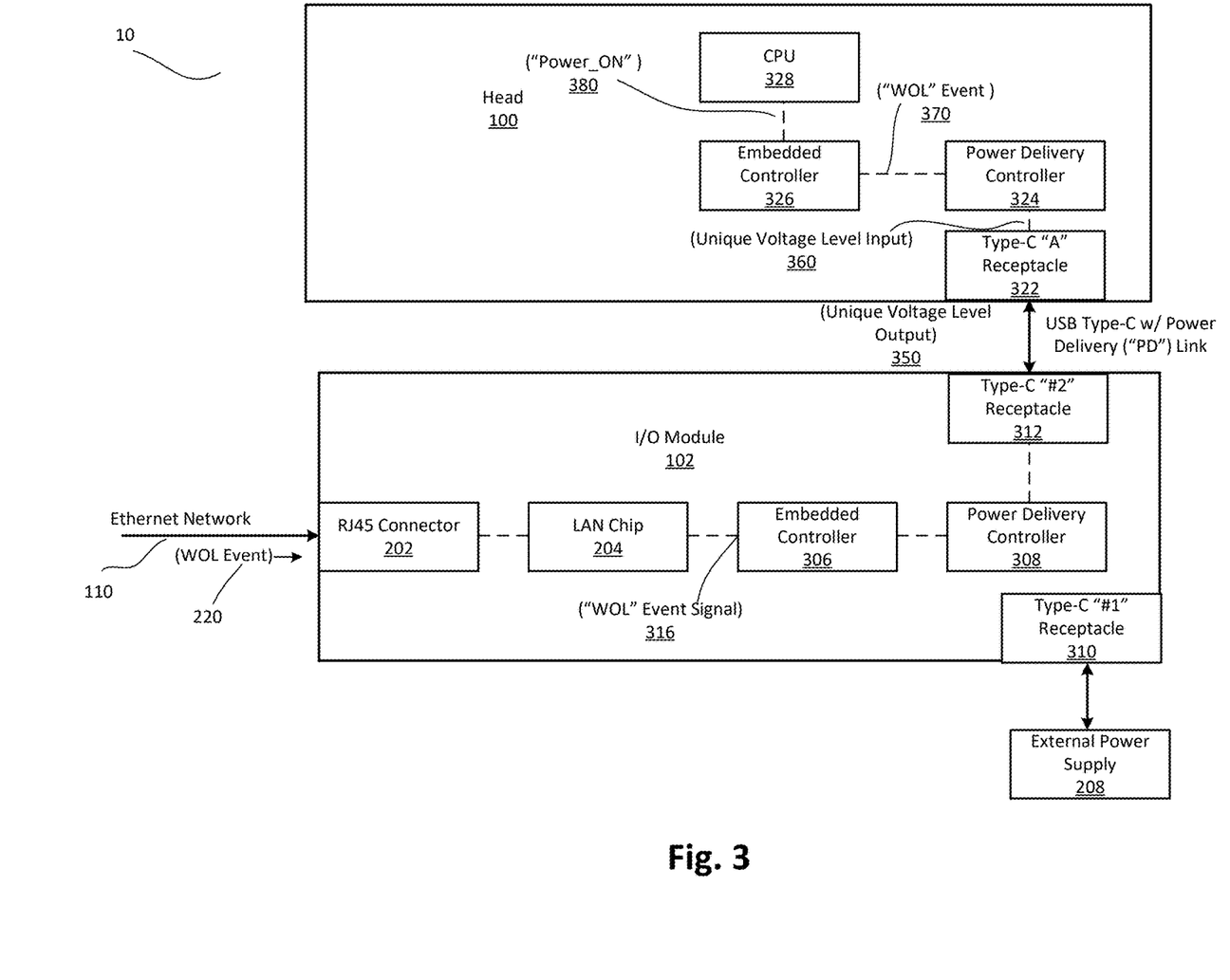
FIG. 3 is a block diagram of the POS system of FIG. 1 and flow diagram of the remote wake functionality in accordance to embodiments.

FIG. 3 is a block diagram of POS system 10 of FIG. 1 and flow diagram of the remote wake functionality in accordance to embodiments. FIG. 3 illustrates a power output control embodiment. In one embodiment, the functionality of the flow diagram of FIG. 3 (and FIG. 4 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

I/O module 102 is coupled to the Ethernet network via Ethernet LAN cable 110, over which it receives the WOL event 220 (i.e., the magic packet) over the network to wake up POS system 10 when it is in power down or low power mode. System 10 operates in embodiments in accordance with the Advanced Configuration and Power Interface ("ACPI"), which provides an open standard that operating systems can use to discover and configure computer hardware components, to perform power management (e.g., putting unused hardware components to sleep), to perform auto configuration (e.g., Plug and Play and hot swapping), and to perform status monitoring. In accordance with ACPI, "S0" is the normal operating state for a computer, and "S3" is the low power sleep state for a computer, so that that wake-up functionality occurs when system 10 is in state S3.

RJ45 connector 202 is coupled to cable 110 and LAN chip 204 for Ethernet based embodiments. In one embodiment, LAN chip 204 is the "Microchip LAN7800T/VSX." An embedded controller 306 is coupled to LAN chip 204 and a USB power delivery ("PD") controller 308. In one embodiment, embedded controller 306 is the "ST Micro STM32G0B1RCT6" and PD controller 308 is the "Texas Instruments TPS65988DH." Additional connectors in I/O module 102 include a Type-C "#1" receptacle 310 that is coupled to external power supply 208, and a Type-C "#2" receptacle 312 that is coupled to a Type-C "A" receptacle 322 of head 100. Receptacles 312 and 322 are coupled via a USB Type-C link/cable with power delivery which carries data and power.

Head 100 includes a power delivery controller 324 coupled to receptacle 322 and an embedded controller 326, which is coupled to a CPU 328. In one embodiment, power delivery controller 324 is the "Texas Instruments TPS65988DH" and embedded controller 326 is the "ST Micro STM32G0B1RCT6." As shown in FIG. 3, in POS system 10, LAN chip 204 is not directly coupled to CPU 328, unlike the prior art system of FIG. 2, and therefore the known WOL solution for waking up system 10 will not work. I/O module 102 provides the power to head 100.

Both of I/O module 102 had head 100 include an embedded controller ("EC") 306, 326, respectively. Each EC subsystem includes hardware (i.e., the EC chip itself) and firmware (i.e., software) control. The power delivery ("PD") controllers 308, 324 in both the I/O module 102 and head 100 are connected to their respective ECs.

The I/O module LAN chip is also connected to the I/O module EC 306. When LAN chip 204 in I/O module 102 receives the WOL event 220, it signals I/O module EC 306 via a WOL event signal at 316. WOL event signal 316 is in the form of a logic signal from LAN chip 204 to EC 306. This is the standard output for a WOL event from the chip, which is named "PME #".

Upon receipt of the WOL event signal at 316, EC 306 manipulates the PD 308 output voltage to head 100 in a defined and unique manner, as a unique voltage level sequence output at 350. In embodiments, for the unique voltage level signaling, EC 306 manipulates its on-board voltage regulator from 15 V to 11 V for a period of 500 ms (0.5 second) and then back to 15 V.

In response to the unique voltage level output at 350, EC 326 in head 100 detects the change in input voltage directly by use of an Analog to Digital Converter input pin.

EC 326 monitors for the specified PD voltage signaling, and then issues the WOL event signal to the CPU, in the form of a "Power_ON" signal at 380, which then wakes system 10. The "Power_ON" signal is from EC 326 to the SOC Power button input pin, and is named "SOC_PWRBTN #."

Figure 4:
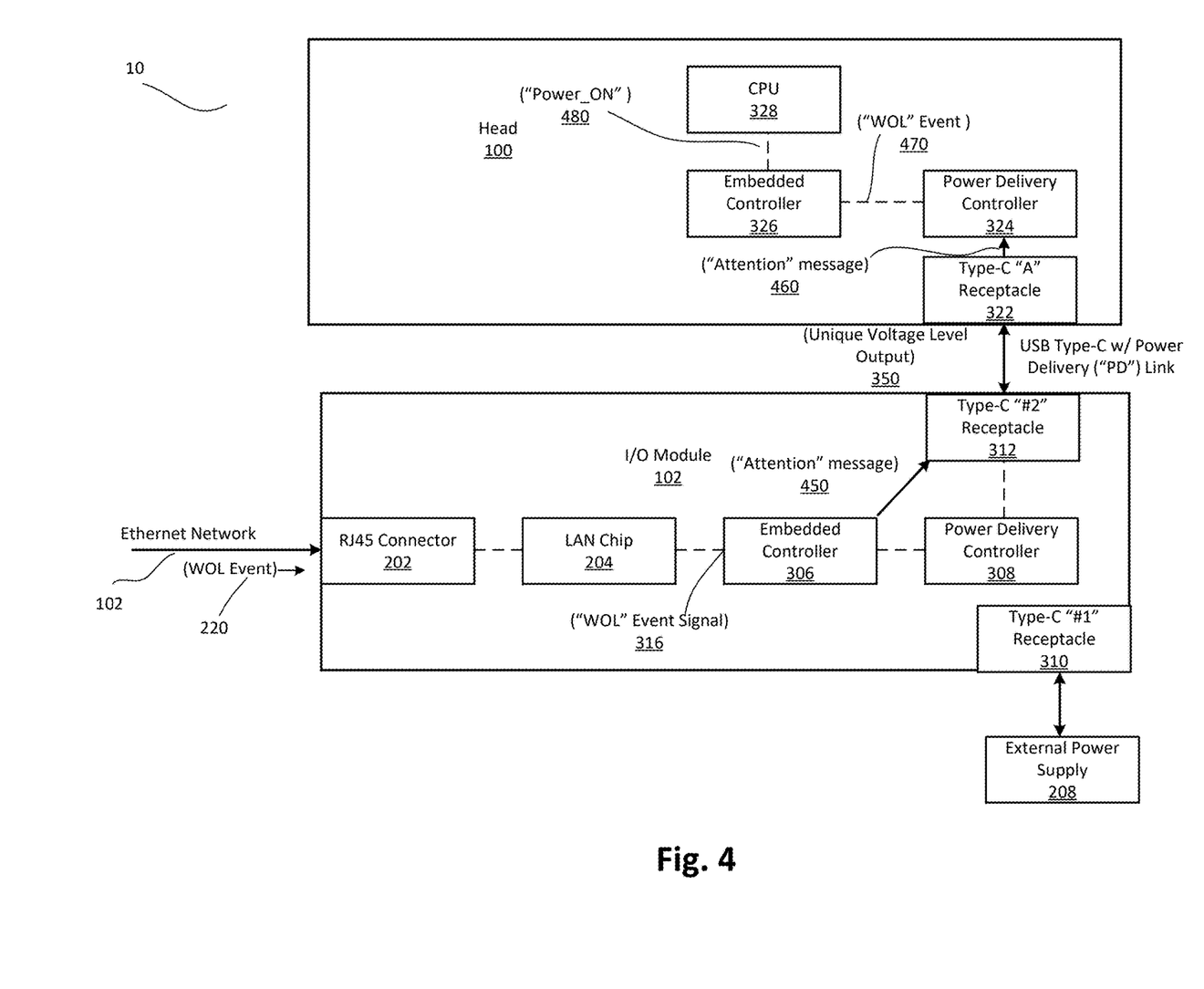
FIG. 4 is a block diagram of the POS system of FIG. 1 and flow diagram of the remote wake functionality in accordance to embodiments.

FIG. 4 is a block diagram of POS system 10 of FIG. 1 and flow diagram of the remote wake functionality in accordance to embodiments. FIG. 4 illustrates a configuration channel ("CC") channel messaging embodiment.

In response to the WOL event 220, at 316 a "WOL" event signal is generated. Upon receipt of the WOL event signal, at 450 EC 306 sends a standard USB-PD "Attention" message via the communication channel ("CC") directly to PD controller 324 at 450, thus bypassing PD controller 308. Because EC controller 306 in I/O module 102 is used to manage PD controller 308, EC controller 306 is able to establish the direct source of the "CC" channel communication channel from I/O module 102 to head 100 via the Type-C "#2" connector 312. In this case, the "Attention" message takes the form of an unused standard USB Type-C event. Embodiments use the Type-C Standard "Audio Accessory Event", and EC 306 issues that Audio Accessory Event. In head 100, PD Controller 324 is configured to map a received "Audio Accessory Event" to an Output signal (PD_ALERT). That output signal (PD_ALERT) is the "WOL" Event 470 and is received by EC 326 in head 100. This triggers EC 326 to send the Power Button signal (SOC_PWRBTN #) to CPU 328, thus waking the system.

At 460, PD controller 324 receives the "Attention" message from the CC channel and at 470 signals EC 326 via a "WOL" event signal.

EC 326 monitors for the "Attention" signal via the CC Channel, and then in response at 480 issues the WOL event signal to CPU 328, in the form of a "Power_ON" signal, which wakes the system.

Figure 5:
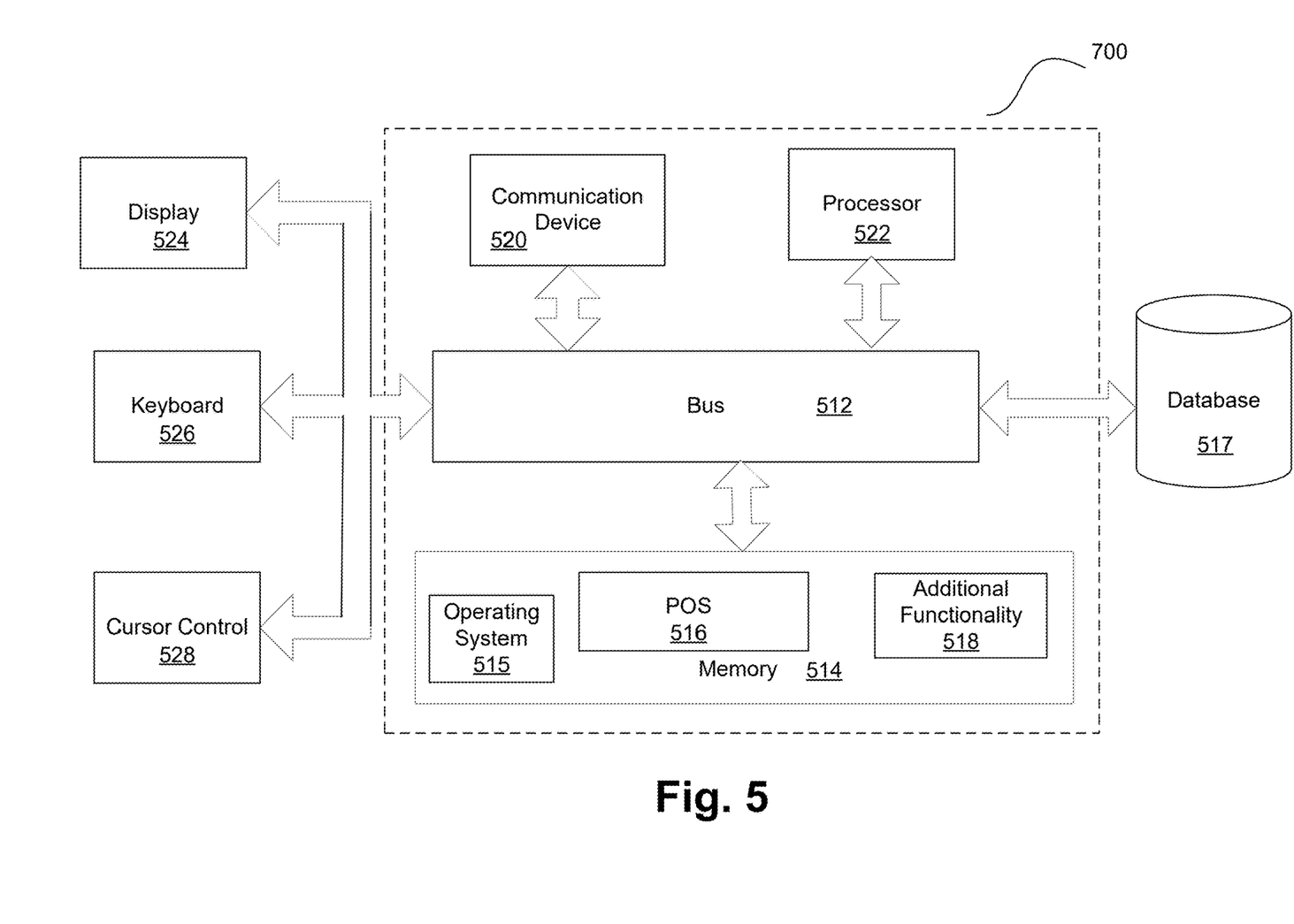
FIG. 5 is a block diagram of a computer server/system in accordance with an embodiment of the invention that may implement head, or any other components of the system of FIG. 1.

As disclosed, in embodiments, head 100 in combination with I/O module 102, and any other servers/elements coupled to system 10 via a network, includes computer software/hardware POS functionality. FIG. 5 is a block diagram of a computer server/system 500 in accordance with an embodiment of the invention that may implement head 100, or any other components of system 10. Although shown as a single system, the functionality of system 500 can be implemented as a distributed system. Further, the functionality disclosed herein can be implemented on separate servers or devices that may be coupled together over a network. Further, one or more components of system 500 may not be included. For example, when implemented as a web server or cloud based functionality, system 500 is implemented as one or more servers, and user interfaces such as the keyboard, mouse, etc. are not needed. Further, in embodiments system 500 is implemented as a touchscreen based tablet when implementing head 100, so the peripheral elements are generally not required or include System 500 includes a bus 512 or other communication mechanism for communicating information, and a processor 522 coupled to bus 512 for processing information. Processor 522 may be any type of general or specific purpose processor. System 500 further includes a memory 514 for storing information and instructions to be executed by processor 522. Memory 514 can be comprised of any combination of random access memory ("RAM"), read only memory ("ROM"), static storage such as a magnetic or optical disk, or any other type of computer readable media. System 500 further includes a communication device 520, such as a network interface card, to provide access to a network. Therefore, a user may interface with system 500 directly, or remotely through a network, or any other method.

Computer readable media may be any available media that can be accessed by processor 522 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 522 is further coupled via bus 512 to a display 524. A keyboard 526 and a cursor control device 528, such as a computer mouse or a touchscreen functionality of display 524, are further coupled to bus 512 to enable a user to interface with system 500.

In one embodiment, memory 514 stores software modules that provide functionality when executed by processor 522. The modules include an operating system 515 that provides operating system functionality for system 500. The modules further include a POS module 516 that provides POS functionality, such as the functionality of "Oracle MICROS Simphony Point of Sale", and all other functionality disclosed herein. System 500 can be part of a larger system. Therefore, system 500 can include one or more additional functional modules 518 to include the additional functionality, such as the functionality of a restaurant or hospitality management system or an enterprise resource planning ("ERP") or inventory management system. A database 517 is coupled to bus 512 (either directly or remotely) to provide centralized storage for modules 516 and 518 and store restaurant data, inventory data, transactional data, etc. In one embodiment, database 517 is a relational database management system ("RDBMS") that can use Structured Query Language ("SQL") to manage the stored data. When centralized, database 517 stores data from multiple local or remote POS systems 10 (e.g., multiple POS systems 10 at a single restaurant or geographically dispersed multiple restaurants).

In one embodiment, particularly when there are a large number of restaurants and a large number of POS systems 10, database 517 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 517, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 500 is a computing/data processing system including an application or collection of distributed applications for enterprise organizations, and may also implement logistics, manufacturing, and inventory management functionality. The applications and computing system 500 may be configured to operate with or be implemented as a cloud-based networking system, a software-as-a-service ("SaaS") architecture, or other type of computing solution.

In embodiments, the functionality of POS system 10 via the implementation of POS software such as "Oracle MICROS Simphony Point of Sale", provides real-time information at the fingertips of both customers and employees. For example, ordering is intuitive, kitchen communication is instant, and updates to daily specials, menu details, and personalized promotions are delivered to each touchpoint (i.e., POS system 10) automatically.

In embodiments, POS system 10 communicates with external devices such as smartphones or laptops to provide online ordering for restaurants. The order is placed online via a website or mobile app. The menu can be managed across all channels to accept orders from the mobile app, website and popular marketplaces. Orders are captured by the cloud-based POS system 10 for a single view of transactions and customer interactions. Orders can be sent directly to the kitchen for preparation. Business logic and decision rules can be set to ensure freshness and promised times. Customers and staff can be informed on the order status. Location technology can be used for smart pickup and customer satisfaction.

Embodiments include a conversational ordering screen that allows orders to be taken the way they are spoken without interrupting the customer. It also encourages cross and upselling while providing the flexibility to change orders on the fly. Each employee can be presented with the conversational ordering screen that is best suited for their particular role, environment, or function. For example, cocktail screens for bartenders and full menu screens for table servers can all be fully customizable.

Embodiments provide a friendly and customizable table management screen that improves efficiency and customer service while helping to turn tables and reach revenue goals. It gives servers the ability see the stage of each dining experience and the amount of time guests have been at each table. Embodiments further can deliver service alerts to help staff be more attentive to each guest.

Embodiments further provide a reservation list that allow a hosting staff to manage all reservation requests quickly and easily. If a restaurant uses future reservations or multiple dining room layouts, a tabbed template can provide staff with an easy way to navigate between wait lists, reservation lists, and table layouts. If a table is not immediately available for seating, the guest can add their name to a wait list. The wait list also shows reservations prior to the scheduled arrival, so the wait list and reservations can be managed from one screen. The hosting staff can add, change, and abandon wait requests from this list, and when wait-listed guests are ready to be seated, the name can be dragged and dropped from the wait list to a table.

Embodiments can integrate with a kitchen system such as the "Oracle MICROS Kitchen Display Systems" to increase kitchen efficiency, reduces errors, enhance food quality, and optimize speed of service. Touch screens, bump bars, and remote views can allow a kitchen staff to easily prioritize food preparation and manage timing across multiple kitchen stations. The kitchen display system can help kitchens manage orders from multiple channels, including in-house waitstaff, self-service kiosks, drive-thru, website, mobile ordering apps, and third-party delivery apps.

In embodiments, POS system 10 includes a secure and open application programming interface ("API") to connect to various online ordering platforms, delivery services, mobile payment processing, etc. Further, POS system 10 can integrate and operate with cash drawers, EMV credit card readers, receipt printers, fingerprint scanners, weight scales, barcode scanners, and other peripherals.

Embodiments can include reporting and analytics. Prebuilt dashboards provide insights on trends, forecasts, and opportunities from a desktop web browser or a mobile app. Embodiments allow for viewing reports by employee, location, region, restaurant type, or across all locations as a whole. Mobile push notifications provide updates and alerts from any locations.

Embodiments can be integrated with an inventory management system to minimize waste by maintaining optimal stock levels. By using real-time forecasting data, embodiments can optimize order timing. Embodiments can also show what should be on the shelf, helping to prevent over-portioning, waste, and theft.

Embodiments can connect with vendors and suppliers. Embodiments can automatically reorder, access invoices online, spot pricing trends, create menu models, etc.

Embodiments can include tools to keep the customers coming back. Embodiments can manage gifts and awards based on visit frequency, amount spent, and items purchased. Embodiments allow customers to view their reward activity in real time and engage with them through targeted, data-driven marketing campaigns to boost the overall customer satisfaction.

Embodiments help managers schedule shifts using forecasting and employee data, helping restaurants avoid excessive overtime costs and scheduling conflicts. Embodiments also support employees with onboarding, training, and time-off requests to ensure staff is educated, comfortable, and primed to deliver the best service.

Embodiments include menu management to provide updating of menu items across POS devices, digital menu screens, websites, and mobile apps in real time. Ingredients, pricing, and adherence to local regulations can all be managed centrally.

As disclosed, embodiments implement a remote wake up functionality for a POS system with a separate head unit and I/O unit.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A point of sale system comprising:
a head unit configured to enter a sleep mode after a period of inactivity;
an input output (I/O) unit coupled to the head unit and coupled to a network, wherein the I/O unit is adapted to receive a Wake-on-LAN (WOL) event over the network, the WOL event comprising a network message;
the I/O unit comprising a Local Area Network (LAN) chip that is adapted to, in response to a received WOL event, generate a WOL event signal to a first embedded controller, the first embedded controller adapted to, in response to the WOL event signal, generate a wake up message and transmit the wake up message to the head unit, wherein the WOL event signal is adapted to cause a processor to wake up when the LAN chip is directly electrically coupled to the processor and the wake up message is different than the WOL event signal;

the head unit comprising a second embedded controller and the processor, the second embedded controller adapted to receive the wake up message and, in response, generate the WOL event signal to the second embedded controller directly electrically coupled to the processor, the WOL event signal causing the processor to exit the sleep mode, wherein the head unit is remote from the I/O unit.

2. The point of sale system of claim 1, further comprising:
a power supply coupled to the I/O unit that provides power to the I/O unit and the head unit;
wherein the second embedded controller is directly coupled to the processor.

3. The point of sale system of claim 2, wherein the I/O unit is coupled to the head unit via a Universal Serial Bus-C cable, and the power to the head unit is provided via the Universal Serial Bus-C cable.

4. The point of sale system of claim 1, wherein the wake up message is transmitted to the head unit using a unique voltage level sequence output from the I/O unit.

5. The point of sale system of claim 4, wherein the unique voltage level sequence is generated by a first power delivery controller on the I/O unit and received by a second power delivery controller on the head unit.

6. The point of sale system of claim 1, wherein the wake up message is transmitted to the head unit using an attention message via a communication channel.

7. The point of sale system of claim 6, wherein the attention message is generated by the first embedded controller on the I/O unit and received by a second power delivery controller on the head unit.

8. The point of sale system of claim 1, wherein the network comprises an Ethernet network.

9. A method of operating a point of sale system comprising a head unit and an input output (I/O) unit coupled to the head unit and coupled to a network, wherein the head unit is configured to enter a sleep mode after a period of inactivity and wherein the I/O unit is adapted to receive a Wake-on-LAN (WOL) event over the network, the WOL event comprising a network message, the method comprising:

the I/O unit comprising a Local Area Network (LAN) chip that, in response to a received WOL event, generates a WOL event signal to a first embedded controller, the first embedded controller, in response to the WOL event signal, generating a wake up message and transmitting the wake up message to the head unit, wherein the WOL event signal causes a processor to wake up when the LAN chip is directly electrically coupled to the processor and the wake up message is different than the WOL event signal;

the head unit comprising a second embedded controller and the processor, the second embedded controller receiving the wake up message and, in response, generating the WOL event signal to the second embedded controller directly electrically coupled to the processor, the WOL event signal causing the processor to exit the sleep mode, wherein the head unit is remote from the I/O unit.

10. The method of claim 9, the point of sale system further comprising a power supply coupled to the I/O unit that provides power to the I/O unit and the head unit;
wherein the second embedded controller is directly coupled to the processor.

11. The method of claim 10, wherein the I/O unit is coupled to the head unit via a Universal Serial Bus-C cable, and the power to the head unit is provided via the Universal Serial Bus-C cable.

12. The method of claim 9, wherein the wake up message is transmitted to the head unit using a unique voltage level sequence output from the I/O unit.

13. The method of claim 12, wherein the unique voltage level sequence is generated by a first power delivery controller on the I/O unit and received by a second power delivery controller on the head unit.

14. The method of claim 9, wherein the wake up message is transmitted to the head unit using an attention message via a communication channel.

15. The method of claim 14, wherein the attention message is generated by the first embedded controller on the I/O unit and received by a second power delivery controller on the head unit.

16. The method of claim 9, wherein the network comprises an Ethernet network.

17. A non-transitory computer readable medium having instructions stored thereon that, when executed by one or more processors, cause the processors to operate a point of sale system comprising a head unit and an input output (I/O) unit coupled to the head unit and coupled to a network, wherein the head unit is configured to enter a sleep mode after a period of inactivity and wherein the I/O unit is adapted to receive a Wake-on-LAN (WOL) event over the network, the WOL event comprising a network message, the operating comprising:

the I/O unit comprising a Local Area Network (LAN) chip that, in response to a received WOL event, generates a WOL event signal to a first embedded controller, the first embedded controller, in response to the WOL event signal, generating a wake up message and transmitting the wake up message to the head unit, wherein the WOL event signal causes a processor to wake up when the LAN chip is directly electrically coupled to the processor and the wake up message is different than the WOL event signal;

the head unit comprising a second embedded controller and the processor, the second embedded controller receiving the wake up message and, in response, generating the WOL event signal to the second embedded controller directly electrically coupled to the processor, the WOL event signal causing the processor to exit the sleep mode, wherein the head unit is remote from the I/O unit.

18. The computer readable medium of claim 17, wherein the I/O unit is coupled to the head unit via a Universal Serial Bus-C cable, and the power to the head unit is provided via the Universal Serial Bus-C cable.

19. The computer readable medium of claim 17, wherein the wake up message is transmitted to the head unit using a unique voltage level sequence output from the I/O unit.

20. The computer readable medium of claim 17, wherein the wake up message is transmitted to the head unit using an attention message via a communication channel.

* * * * *